United States Patent
Elwell et al.

(10) Patent No.: US 10,970,636 B1
(45) Date of Patent: Apr. 6, 2021

(54) ADAPTIVE SYSTEM FOR PREDICTING INTEGRATION FAILURES IN LARGE SYSTEMS

(71) Applicant: INTUIT INC., Mountain View, CA (US)

(72) Inventors: Joseph Elwell, San Diego, CA (US); Damien O'Malley, San Diego, CA (US); Dharin Nanavati, San Diego, CA (US); Aliza Carpio, San Diego, CA (US)

(73) Assignee: Intuit Inc., Mountain View, CA (US)

( * ) Notice: Subject to any disclaimer, the term of this patent is extended or adjusted under 35 U.S.C. 154(b) by 774 days.

(21) Appl. No.: 15/416,442

(22) Filed: Jan. 26, 2017

(51) Int. Cl.
*G06N 5/02* (2006.01)
*G06N 7/00* (2006.01)

(52) U.S. Cl.
CPC .............. *G06N 5/022* (2013.01); *G06N 7/005* (2013.01)

(58) Field of Classification Search
CPC .............. G06N 5/00; G06N 5/02–025; G06N 7/00–005; G06N 20/00; G06F 8/60–77; G06F 11/36–3696
USPC ........ 706/12, 45–47; 717/100–103, 120–122, 717/124–135
See application file for complete search history.

(56) References Cited

U.S. PATENT DOCUMENTS

| | | | | |
|---|---|---|---|---|
| 5,086,479 | A * | 2/1992 | Takenaga | G06K 9/66 382/157 |
| 9,274,935 | B1 * | 3/2016 | Lachwani | G06F 11/3688 |
| 9,626,283 | B1 * | 4/2017 | Zlatnik | G06Q 10/06 |
| 2010/0211932 | A1 * | 8/2010 | Jones | G06F 8/20 717/124 |
| 2012/0284684 | A1 * | 11/2012 | Michaely | G06F 8/30 717/103 |
| 2013/0254746 | A1 * | 9/2013 | Balakrishnan | G06F 11/3684 717/124 |
| 2014/0053135 | A1 * | 2/2014 | Bird | G06F 8/71 717/124 |
| 2014/0074806 | A1 * | 3/2014 | Koren | G06F 40/253 707/694 |
| 2015/0100940 | A1 * | 4/2015 | Mockus | G06F 8/70 717/101 |

(Continued)

OTHER PUBLICATIONS

Hassan et al "Using Decision Trees to Predict the Certification Result of a Build", 2006, 21st IEEE International Conference on Automated Software Engineering.*

(Continued)

*Primary Examiner* — Jue Louie
(74) *Attorney, Agent, or Firm* — Patterson + Sheridan LLP

(57) ABSTRACT

Techniques are disclosed for predicting the probability of successfully building the software application whether an integration build between source components of a software application will be successful. An integration service executing on a server computer determines whether to test an integration build of source components of a software application. The integration service obtains metrics related to the developer of each component as well as any previous integration builds of the components. Based on the metrics, the integration service predicts a probability of a successful integration build of the source components. Based on the probability of a successful integration build, the integration service may notify a developer to perform an action to increase the likelihood of the integration build being successful.

20 Claims, 7 Drawing Sheets

(56) References Cited

U.S. PATENT DOCUMENTS

| | | | | |
|---|---|---|---|---|
| 2015/0293834 | A1* | 10/2015 | Potdar | G06F 8/30 |
| | | | | 717/131 |
| 2017/0003948 | A1* | 1/2017 | Iyer | G06F 8/65 |
| 2017/0060546 | A1* | 3/2017 | Prasad | G06F 8/41 |
| 2018/0074936 | A1* | 3/2018 | Broadbent | G06F 11/36 |
| 2018/0129497 | A1* | 5/2018 | Biddle | G06F 11/3668 |

OTHER PUBLICATIONS

Finlay et al. "Data Stream Mining for Predicting Software Build Outcomes Using Source Code Metrics", 2014, Information and Software Technology.*

Costa et al. "TIPMerge: Recommending Experts for Integrating Changes across Branches", Nov. 13-18, 2016, FSE'16.*

Servant et al. "WHOSEFAULT: Automatic Developer-to-Fault Assignment through Fault Localization", 2012, 34th International Conference on Software Engineering (ICSE).*

* cited by examiner

ADAPTIVE SYSTEM FOR PREDICTING INTEGRATION FAILURES IN LARGE SYSTEMS

BACKGROUND

Field

Embodiments presented herein generally relate to techniques for building software. More specifically, embodiments presented herein provide techniques for predicting integration build failures between source components in software development teams.

Description of the Related Art

Development of software applications is typically divided into specific development teams. Each development team is responsible for a specific source component that is to become part of the larger application. Typically, a given team builds a harness to test an integration build of their component with other components of the application. The harness may mimic other components in the application that interact with the component of the given team once integrated into the application. For example, a harness may be generated based on a previous version of source code for the component that interacts with component of the given team. This approach assumes that the other components in the larger application do not change once the harness is built. However, other development teams may concurrently work on and modify the source code of those other components. Thus, the given team does not know if an integration build of their component into the larger application results in a successful integration.

To minimize the number of failed integration builds, development teams can test their components against other components before their component is integrated into the larger application. However, a development team may not know when to test their component and whether the other components in the application have been modified by other development teams.

SUMMARY

One embodiment presented herein includes a method for predicting an integration failure. The method may generally include monitoring integration builds between source components of a software application under development to determine whether the integration build was successful. Each integration build may include at least a first one of the source components and a second one of the source components. The method may also include comparing the monitored integration builds with prior integration builds of the software application. The method may also include predicting, based on the comparison, a probability of successfully building the software application from the source components.

Another embodiment presented herein includes a computer-readable storage medium storing instructions, which, when executed on a processor, perform an operation to predict an integration failure. The operation may generally include monitoring integration builds between source components of a software application under development to determine whether the integration build was successful. Each integration build may include at least a first one of the source components and a second one of the source components. The operation may also include comparing the monitored integration builds with prior integration builds of the software application. The operation may also include predicting, based on the comparison, a probability of successfully building the software application from the source components.

Still another embodiment presented herein includes a system having a processor and a memory hosting an application, which, when executed on the processor performs an operation to predict an integration failure. The operation may generally include monitoring integration builds between source components of a software application under development to determine whether the integration build was successful. Each integration build may include at least a first one of the source components and a second one of the source components. The operation may also include comparing the monitored integration builds with prior integration builds of the software application. The operation may also include predicting, based on the comparison, a probability of successfully building the software application from the source components.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, may admit to other equally effective embodiments.

DETAILED DESCRIPTION

Figure 1:
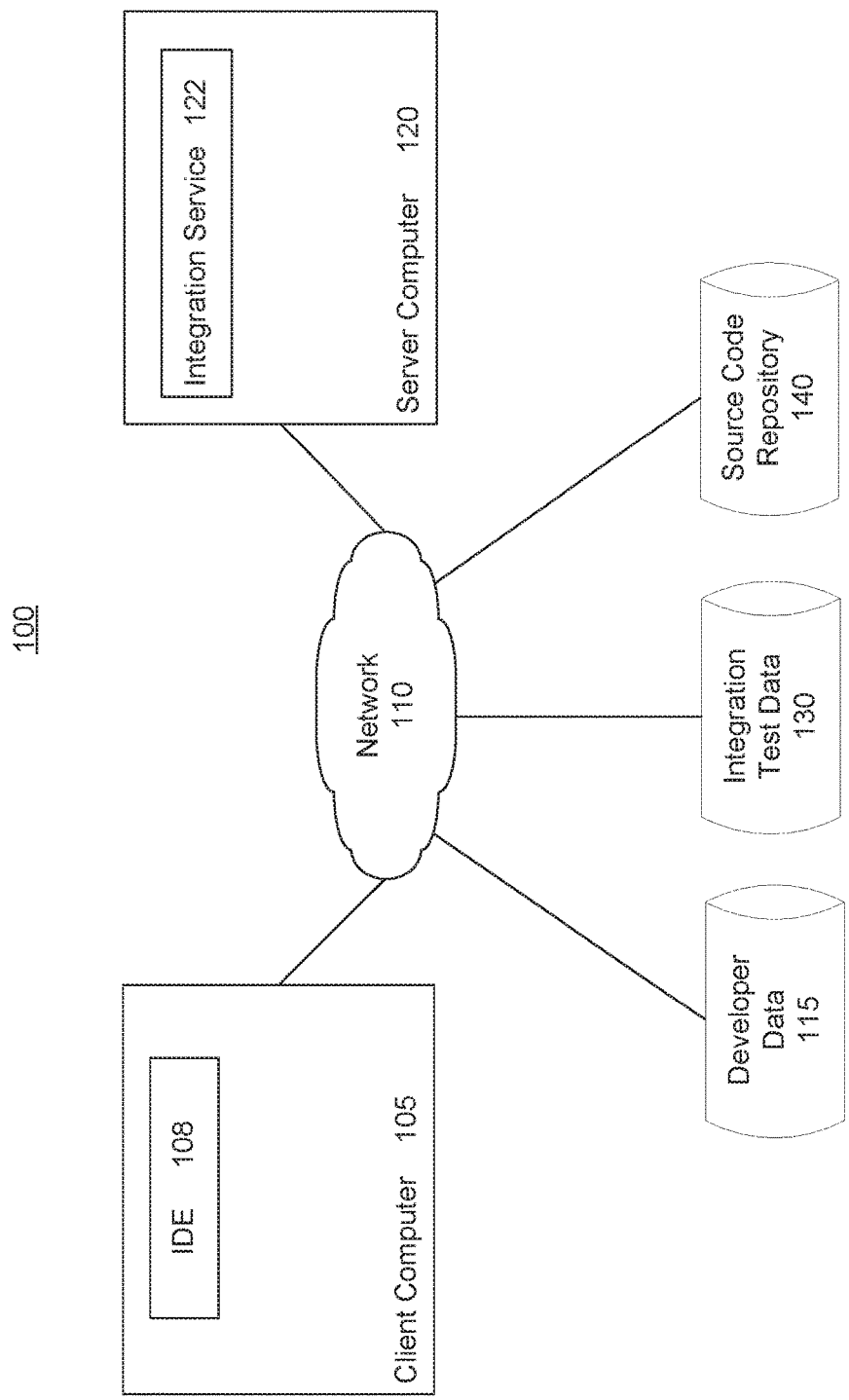
FIG. 1 illustrates an example computing environment, according to one embodiment.

Embodiments presented herein provide techniques for predicting the probability of a successful integration build of a software application. More specifically, embodiments presented herein provide techniques for predicting a probability of a successful integration build between various source components that are part of a larger software application.

In this context, an integration build may refer to combining various source components into a single software application such that each component operates to achieve the overarching goal of the software application. For example, a software application for personal taxes may include individual source components such as a tax engine to determine what information is needed from a user to generate a tax return, a user interface that the user can interact with to provide tax information, and an interview service to ask tax specific questions to the user. To build the personal tax application, each source component is integrated into the software application. The software application is tested to ensure each component functions properly when interacting with the other components. Each component may be developed by a specific team. Therefore, an integration build of a software application may not be tested until each component is completed.

In one embodiment, an integration service executing on a server computer determines whether to test an integration build of a software application. For example, the integration service may monitor an integration test schedule to determine when to test an integration build of the software application. The integration service may also receive a request from a user (or other third party) to test the integration build of the software application. Further, the integration service may determine when to test the integration build of the software application based on integration and developer metrics. In that case, the integration service may first determine if any source code has been checked-in by a developer since the last integration build was performed. If a check-in has not occurred, then nothing in the source code has changed and the integration test is not necessary at that time. If a check-in has occurred, then the integration service may determine whether to test the integration build between the components of the software application.

Upon determining that the integration build should be tested, the integration service may obtain integration metrics and developer metrics related to each component in the software application. Integration metrics may include data regarding previous integration builds between components, such as a length of time to build various components, which components were built, whether the build was tested, and whether the test succeeded. Developer metrics may include data related to a given developer, such as an identity of the developer, a team of the developer, source components that developer has contributed to, whether that developer tested an integration build with another component and whether the test succeeded. Developer metrics may also include a number of check-ins by that developer, an amount of code that developer has checked-in, how many times that developer built their code each day and how many builds were successful or failed.

The integration service may analyze the obtained metrics to determine a probability of a successful integration build of the software application. For example, based on the obtained metrics, the integration service may determine that the probability of a successful integration build of the software application is low because a user profile component and a user interface component do not interact properly. In that case, the integration component may identify a developer that worked on one of those components and notify that developer of a specific action that should be taken to increase the probability of a successful integration build. For example, the developer may be notified to increase the number of integration builds being tested between their component and other components of the application.

Advantageously, embodiments disclosed herein provide techniques to predict the likelihood of a successful software integration build. That is, the disclosed embodiments provide techniques to continuously monitor and predict whether a software integration build will succeed throughout the development of the software application.

FIG. 1 illustrates an example computing environment 100, according to one embodiment. As shown, the computing environment 100 includes a client computer 105, a network 110, a server computer 120, and databases for developer data 115, integration test data 130, and a source code repository 140. Network 110 may be a physical or wireless network.

As shown, client computer 105 includes an integrated development environment (IDE) 108 and the server computer 120 includes an integration service 122. The IDE 108 executes on the client computer 105 and may be used by a developer in building various source components to be included into a larger software application. Integration service 122 may be notified each time the developer checks-in a piece of code. The source code repository 140 stores source code for each source component of the software application.

Developer data 115 may store developer metrics related to each developer working on a software application. For each developer, these metrics may include an identity of the developer, a team of the developer, source components the developer has worked on, a number of check-ins by the developer, an amount of code the developer has checked-in, how many time the developer built their code each day, how many builds were successful or failed, etc.

Integration test data 130 may store integration metrics related to integrations between source components that have been tested by a developer. The integration metrics may include a length of time to integrate various components, which components were integrated, whether the integration build was tested, whether the test was successful or failed, etc. Integration test data 130 may also store metrics related to previous integration builds between the source components. For example, if each component of the software application is integrated and tested, integration test data may store whether that test was successful or not.

Each time code is checked-in by a developer, the integration service 122 may obtain developer metrics from developer data 115 and integration metrics from integration test data 130. The integration metrics may include metrics related to each source component the developer has worked on as well as other source components of the software application.

Once the developer and integration metrics are obtained, the integration service 122 may analyze the metrics to determine a probability of a successful integration build of the software application. For example, integration service 122 may determine that that an integration build between a user interface component and an interview service fails based on the obtained metrics. Thus, the probability of a successful integration build between these components is low. Based on the obtained metrics, the integration service 122 determines which developer worked on the component and notifies that developer. The developer may be notified that the component would likely cause an integration of the software application to fail and that one or more additional integration builds should be performed between that component and other specified components of the software application.

Based on the notification, the developer may test an integration build between their component and another component, and debug their component so that the tested integration build of the software application is successful. Once the developer debugs their component and tests the integration build between the debugged component and other components in the software application, some developer and integration metrics may be updated. For example, when the developer checks-in the source code of the debugged component, developer metrics may be updated to indicate at what time the component was checked-in and what component other component was integrated and tested with the debugged component.

The integration service 122 may again determine the probability that an integration build of the software application is successful. If the integration build fails, the integration service 122 may notify the developer to perform additional integration testing and debugging. If the integration build is determined to be successful, the integration service 122 may notify the developer to proceed with building the components. In other embodiments, the developer may not be notified if the integration build is successful.

Figure 2:
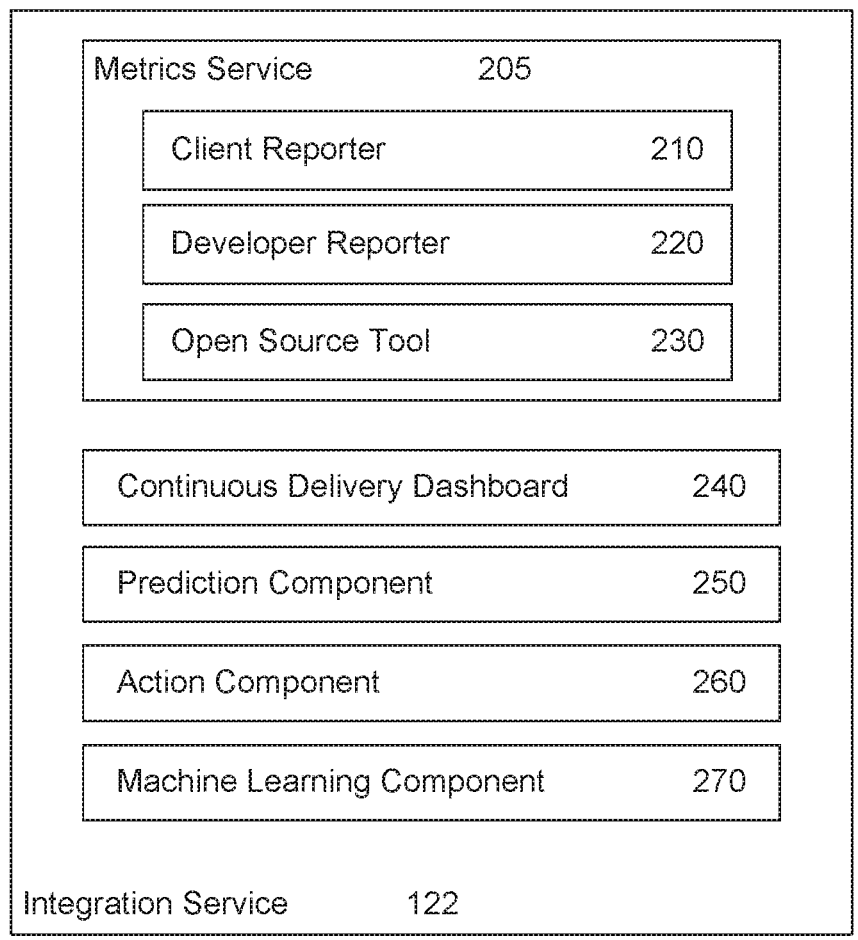
FIG. 2 illustrates an integration service, according to one embodiment.

FIG. 2 illustrates an integration service 122, according to one embodiment. As shown, the integration service 122 includes a metrics service 205, a continuous delivery dashboard 240, a prediction component 250, an action component 260 and a machine learning component 270.

The metrics service 205 obtains developer metrics and integration metrics for each developer and each component in the software application. As shown, the metrics service 205 includes a client reporter 210, a developer reporter 220 and an open source tool 230. The client reporter 210 may obtain integration metrics related to each source component to be integrated into the software application. For example, client reporter 210 may report an identity of each developer who contributed to building component, a length of time to integrate a component into the application, whether the integration build was successful, what component was integrated into the application, the developer that integrated the component, the team of that developer, as well as other metrics related to each component of the software application.

The developer reporter 220 may obtain developer metrics for each developer that worked on a component of the software application. Developer metrics may include an identity of each developer working and the components that developer contributed to, an amount of code checked-in by each developer, a number of times a developer integrated their component into the software application each day, a number of times the integration build was successful, etc.

Open source tool 230 may act as a source control system and maintain a continuous log of check-ins by each developer. For example, each time a developer checks-in a piece of code, open source tool 230 updates log data to indicate the component checked-in and at what time that component was checked-in.

The continuous delivery dashboard 240 may deploy a component to a development server (not shown) each time a developer checks-in source code for that component. Based on the developer and integration metrics from the metrics service 205, the prediction component 250 determines a probability of a successful integration build of the software application and compares that probability to a predetermined target success percentage. If the probability satisfies the target success percentage, the prediction component 250 may not take any action or may notify the developer to proceed with building the source component.

If the probability does not satisfy the target success percentage, the action component 260 may determine an action to be taken by one or more developers to increase the probability of a successful integration build. For example, the action component may determine that a developer of a tax engine component should test an integration build between the tax engine component and a representation component. In such a case, the action component 260 notifies the developer of the tax engine component to test the integration build between that component and the representation component.

The machine learning component 270 may be used along with the prediction component 250 to determine a probability of a successful integration build between source components. To do so, the machine learning component 270 may use integration metrics from the integration test data 130. For example, based on the integration metrics, the machine learning component 270 may determine that a previous integration build of the software application was successful when the integration between the tax engine component and the representation component was tested. Therefore, if the integration build between those components was not tested in the integration build of the application being analyzed, then the machine learning component may determine that the integration build of the application is not successful.

Upon determining that the integration build is successful, the continuous delivery dashboard 240 may integrate each component into the software application. Once the application is integrated, the continuous delivery dashboard 240 may notify a quality engineer to manually review the integration to ensure the integration is successful. If so, the quality engineer may update an integration metric to indicate that the integration was reviewed by a quality engineer and was successful.

Figure 3:
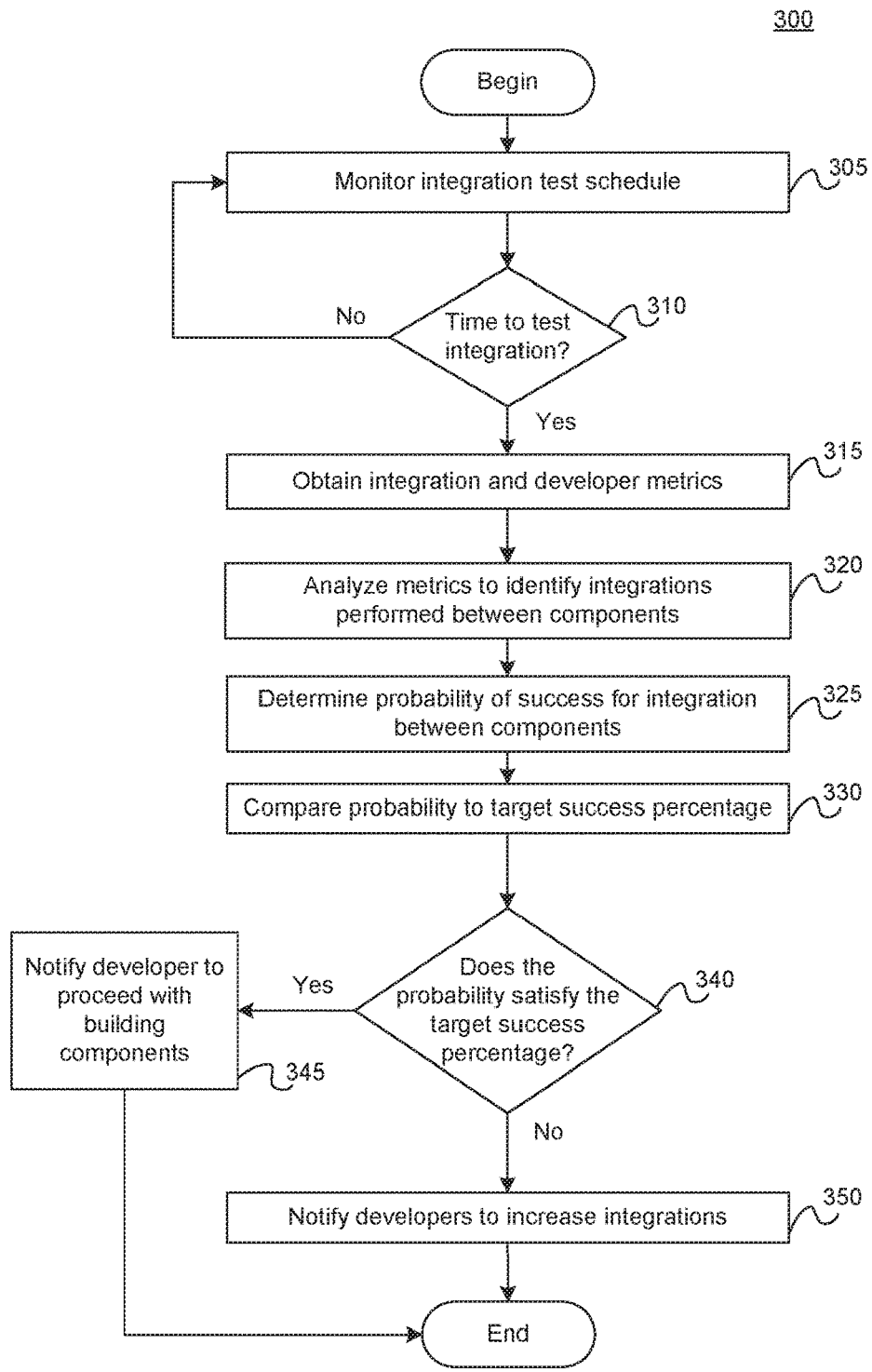
FIG. 3 illustrates a method for predicting a probability of a successful integration build of a software application, according to one embodiment.

FIG. 3 illustrates a method 300 for predicting a probability of a successful integration between source components, according to one embodiment. As shown, the method 300 begins at step 305 where an integration service monitors an integration test schedule. At step 310, the integration service may determine whether an integration build needs to be tested based on the schedule. For example, the integration test schedule may indicate that an updated version of the software application is scheduled to be released in a software product in two weeks and that a test of an integration build of the software application is required at least one week before the release date. Thus, an integration build is not needed until one week prior to the release date. In that case, the integration service continues to monitor the test schedule. One week before the release date of the software product, the integration service determines that a test of an integration build is to be completed.

Upon determining that an integration test should be performed, a metrics service of the integration service obtains integration and developer metrics at step 315. The integration metrics may include metrics related to integration builds between source components, such as a length of time to integrate source components, which components were integrated, whether the integration was tested and whether the test was successful. The developer metrics may include data related to developers working on components of the software application, such as an identity of each developer that worked on a component, a team of each developer, each source component worked on by each developer, and whether a developer integrated source components.

At step 320, the metrics service analyzes the obtained metrics to identify integration builds between source components of the software application that have been tested. For example, the metrics service determines what components have been integrated by each developer and whether those integration builds were successful. Based on the obtained metrics, a prediction component determines a probability of a successful integration build of the software application at step 325. For example, the prediction component may identify a source component that has been modified since a previous integration build of the application was performed and determine whether a build between that component and another component would cause the integration build of the application to fail. If so, the prediction component decreases the probability of a successful integration build.

Once the metrics are analyzed and the probability of a successful integration build is determined, the prediction component compares the probability to a predetermined target success percentage at step 330. If the probability satisfies the target success percentage at step 340, the prediction component notifies the developer of each component to proceed with building their respective components. If the probability does not satisfy the target success percentage at step 340, an action component may notify the developer of a specific component to test an integration build between the component worked on by that developer and one or more other components of the software application at step 350.

Figure 4:
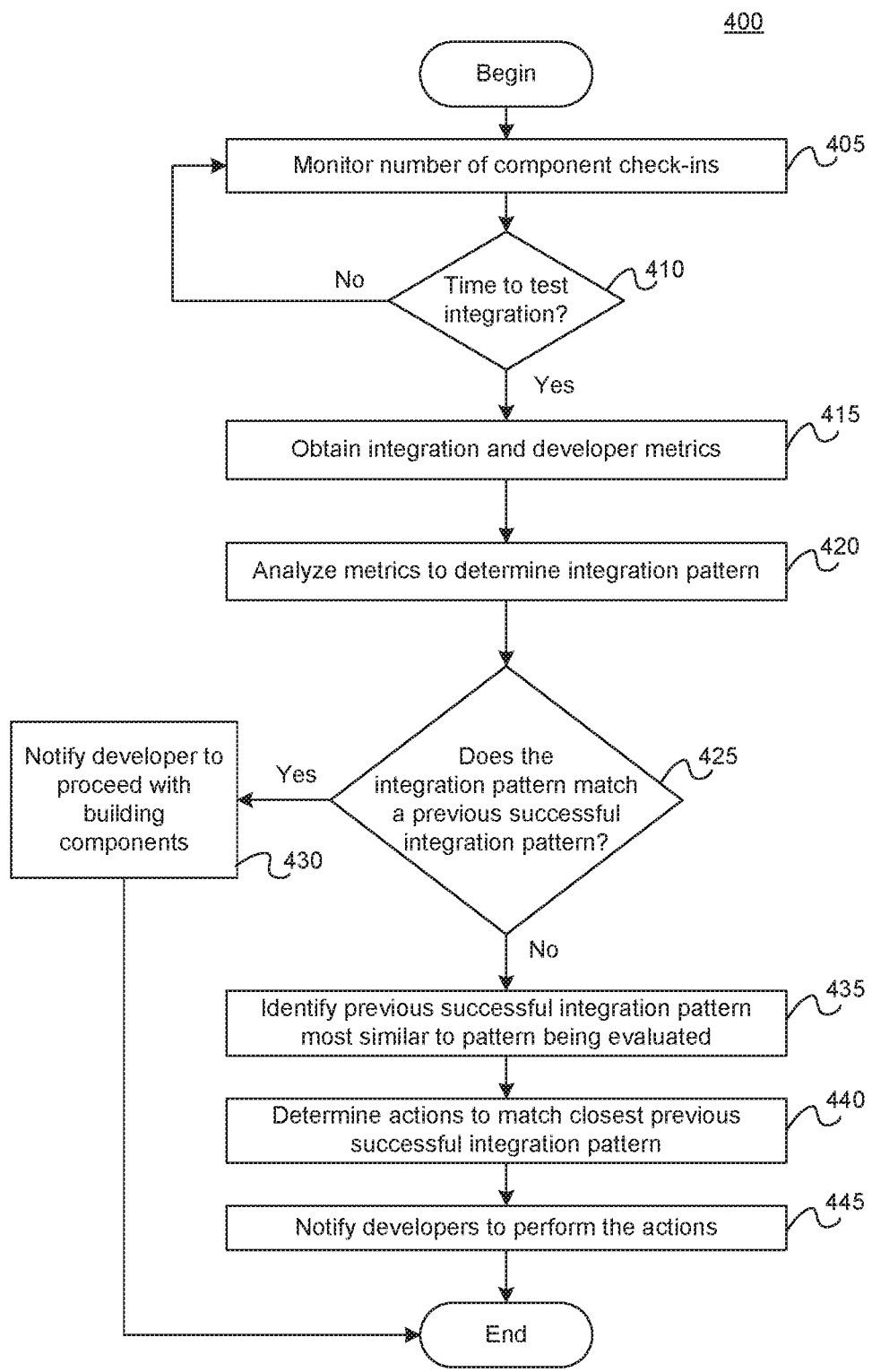
FIG. 4 illustrates a method for identifying a successful integration build of a software application, according to one embodiment.

FIG. 4 illustrates a method 400 for identifying a successful integration build of a software application, according to one embodiment. As shown, method 400 begins at step 405 where an integration service monitors a number of times source code for a given component is checked-in by the developer. At step 410, the integration service determines whether the number of times that source code is checked-in satisfies a predetermined value. If not, the integration service continues to monitor the number of check-ins.

Upon determining the number of check-ins satisfies the predetermined value, the integration service obtains developer and integration metrics for the component at step 415. For example, developer metrics may be data related to a developer of the component being evaluated. The developer metrics may include an identity of the developer, whether the developer has integrated the component with other components in the application, which components that developer has worked on, a team of the developer, etc. The integration metrics may include data related to integration builds between components, such which components have been integrated, whether the integrations have been tested, and whether the tests were successful.

At step 420, a prediction component analyzes the obtained metrics to identify an integration pattern. For example, the prediction component determines whether an integration build between each component in the software application has been tested. At step 425, the prediction component compares the pattern to previous integration patterns that have been tested in a previous integration build of the software application and were successful. The integration patterns of previous integration tests may be stored with the integration metrics in a database for integration test data. If the pattern being analyzed matches a previous successful integration pattern, the prediction component may notify developers of the application to proceed with building each component at step 430.

Upon determining that the integration pattern being analyzed does not match a previous integration pattern that was successful, the prediction component may identify a successful pattern that is closest to the pattern being analyzed at step 435. For example, the prediction component may determine that the pattern being analyzed does not exactly match a previous successful pattern, but only differs by two tests of integration builds between components. In other words, the prediction component may determine that the closest successful pattern included a tested integration build between a tax engine and an interview service and a tested integration build between a completion component and a pricing service. Thus, for the pattern being analyzed and the successful pattern to be identical, the integration builds between these components need to be tested.

At step 440, an action component determines one or more actions to be performed so that the pattern being analyzed matches the closest successful pattern. Continuing with the example above, the action component may determine that the integration build between the tax engine and the interview service needs to be tested as well as the integration build between the completion component and the pricing service. At step 445, the action component notifies developers of those components to test the respective integration builds.

Figure 5:
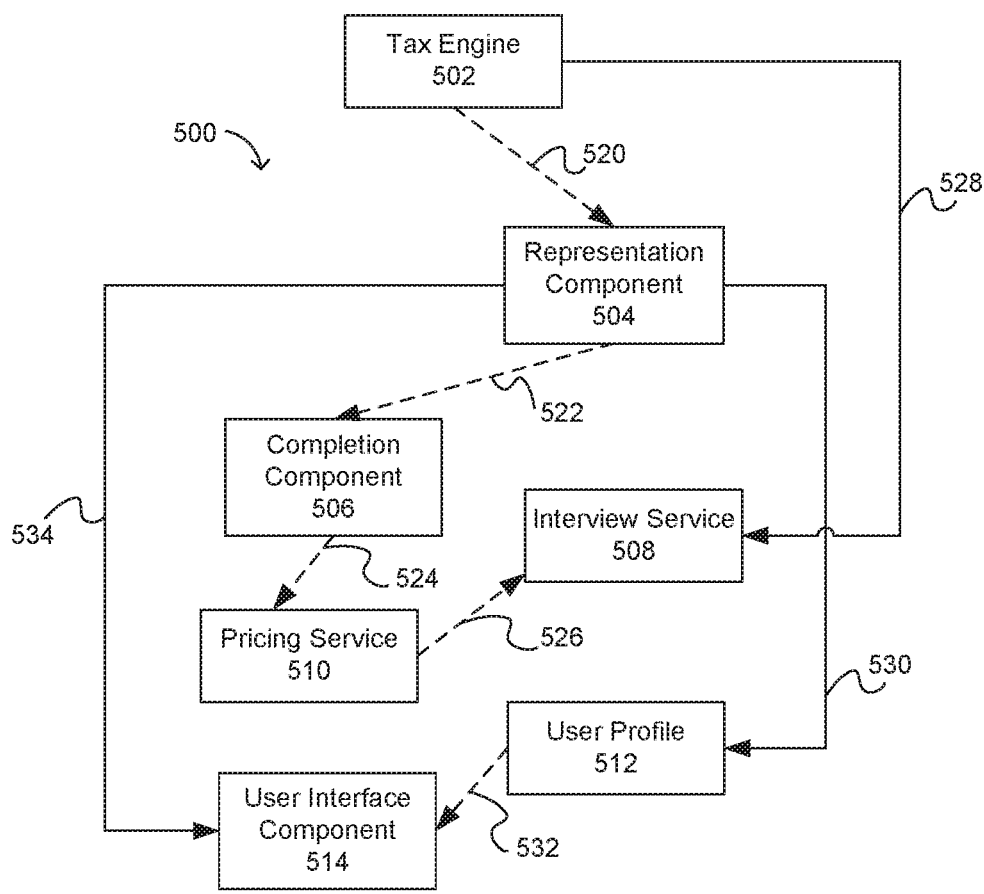
FIG. 5 illustrates an integration build of a software application, according to one embodiment.

FIG. 5 illustrates an integrated software application 500, according to one embodiment. As shown, the source components include a tax engine 502, a representation component 504, a completion component 506, an interview service 508, a pricing service 510, a user profile 512 and a user interface component 514. These components may be representative of components found in a tax preparation software product. The integrated software application 500 depicts a successful integration test of the software application.

The tax engine 502 determines what tax information is needed to complete a tax return for a user. The representation component 504 displays a window to the user requesting information needed by the tax engine 502. For example, if the tax engine 502 needs an address of the user to complete the tax return, the representation component 504 may generate a window to request the address.

The completion component 506 provides a shopping cart such that the user can pay for the tax services provided by the tax preparation software application. The interview service 508 asks the user a series of questions to obtain information needed to calculate income taxes for the user. For example, the interview service 508 may ask whether the user bought a house during the previous tax year. The interview service 508 may also be used by the tax engine 502 to obtain information from the user.

The pricing service 510 provides a price for each tax service provided by the tax preparation system. The pricing service 510 may be used by the completion component 506 and the interview service 508 to indicate to the user how much an action costs. The user profile 512 provides an overview page when the user opens the tax preparation software product, but before the user begins the tax preparation process. For example, when the user open the software product, the first page seen by the user may be an overview page that displays a tax return from the previous year and actions that can be taken, such as begin a tax return. The user interface component 514 takes the output from the representation component 504 and renders it be viewed by the user.

Each arrow between the various components indicates whether an integration build between the components has been tested. A dashed arrow, such as arrows 520, 522, 524, 526 and 532, indicates an integration build that has not been tested. A solid arrow, such as arrows 528, 530 and 534, indicates a integration build between components has been tested. The solid arrows also indicate that the components have been modified by a developer such that a test of the integration build between the respective components is successful.

Upon determining that an integration build is to be tested, a metrics service may obtain developer metrics and integration metrics associated with the software application. The integration metrics may indicate whether an integration build between two components was tested. For example, the integration metrics may indicate that an integration build between the representation component 504 and the user interface component 514 was tested and successful, as indicated by arrow 534.

Based upon the developer and integration metrics, the prediction component may determine the probability of a successful integration build of the software application. The prediction component compares the probability to a predetermined target success percentage. If the probability satisfies the target success percentage, each development team continues working on their components. However, if the probability does not satisfy the target success percentage, an action component may determine an action to be taken that increases the probability to equal the target success percentage. The action component may also determine a particular developer who should perform the action and notify that developer of the suggested action. For example, the action component may notify a developer of the representation component 504 to test an integration build between the representation component 504 and the user interface component, as indicated by arrow 534.

Once the action is performed, the developer may modify source code of one or more of the tested components so that a subsequent test of the integration build between the components is successful. When the developer checks-in the modified source code, the metrics service may obtain updated developer and integration metrics. The prediction component may determine the probability of a successful integration build of the application with the components as modified.

Figure 6A:
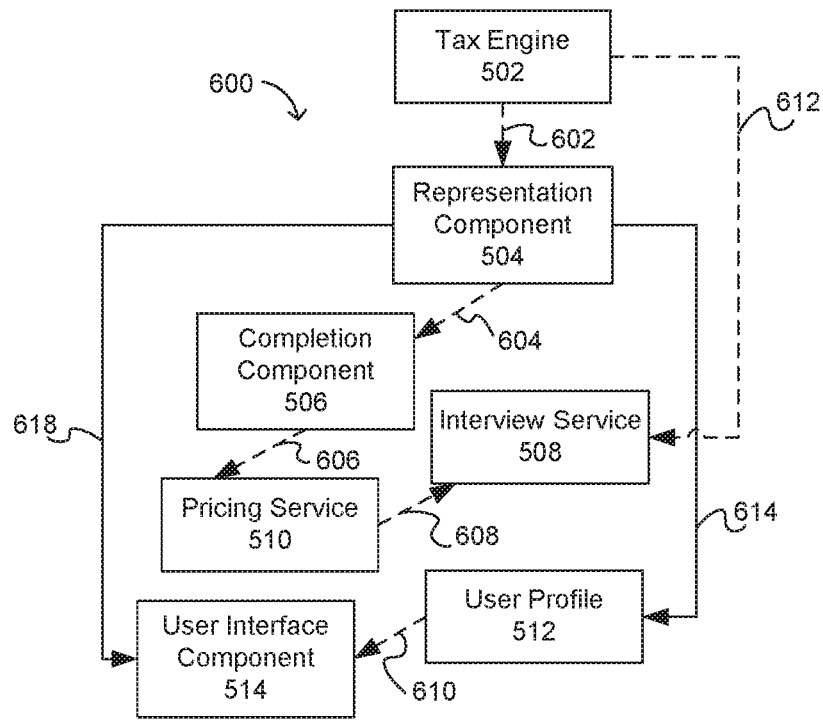
FIG. 6A illustrates an example of a failed integration pattern of a software application, according to one embodiment.

FIG. 6A illustrates an example of a failed integration pattern 600 of a software application, according to one embodiment. The components depicted in FIG. 6A correspond to the components of the integrated software application 500 described with reference to FIG. 5.

Similarly, the dashed arrows 602, 604, 606, 608, 610 and 612 indicate that an integration build between the relative components has not been tested. The solid arrows 614 and 618 indicate that an integration build between the relative components has been tested and the test was successful.

An integration service may obtain developer and integration metrics. Based on the obtained metrics, a prediction component may determine there is a low probability of a successful integration build of the software application. An action component may obtain integration metrics to determine which component caused the integration to fail. The action component may also obtain developer metrics to determine an identity of a particular developer that worked on that component.

If the low probability of a successful integration does not satisfy a predetermined target success percentage, the action component determines an action to increase the probability of a successful integration and notifies the developer of that component to perform the action. For example, the action component may determine that the probability of a successful integration build of the software application is increased if the developer that worked on the tax engine 502 tests the integration between the tax engine 502 and the interview service 508, as indicated by dashed arrow 612. To further increase the probability of a successful integration, the action component may determine that the integration build between the completion component 506 and the pricing service 510 should be tested by the developer of the completion component 506, as indicated by dashed arrow 606.

Figure 6B:
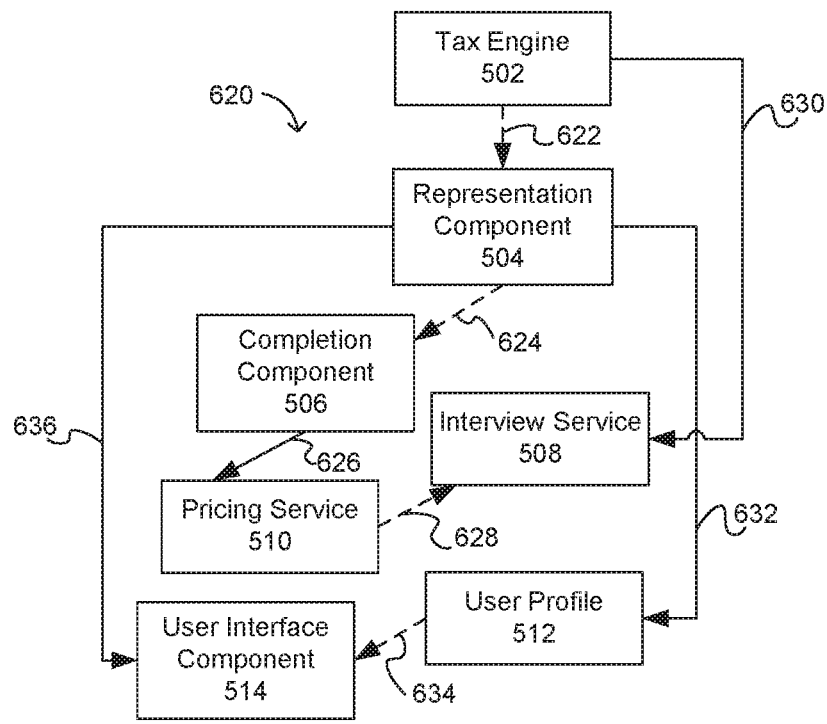
FIG. 6B illustrates an example of a successful integration pattern of a software application, according to one embodiment.

FIG. 6B illustrates an example of a successful integration pattern 620 of a software application, according to one embodiment. The components depicted in FIG. 6B correspond to the components of the integrated software application 500 and the failed integration pattern 600 of a software application described with reference to FIGS. 5 and 6A, respectively.

Similarly, each solid arrow, such as 630, 632 and 636, indicate that an integration build has been tested between the respective components. Each dashed arrow, such as 622, 624, 626, 628 and 634 indicate that an integration build has not been tested between the respective components.

Continuing with the example discussed with respect to FIG. 6A, an integration build between the tax engine 502 and the interview service 508 has been tested, as indicated by solid arrow 630. Further, as indicated by solid arrow 626, the integration build between the completion component 506 and the pricing service 510 has been tested. Once the developer performs these integration builds as suggested by the action component, the integration service may obtain updated developer and integration metrics. Based on the updated metrics, the prediction component may determine a probability of a successful integration build of the application and compare the probability to the target success percentage.

Based on the tested integration builds, as suggested by the action component, the probability of a successful integration build of the application is higher and likely satisfies the target success percentage. Once the probability does satisfy the target success percentage, a quality engineer may use a continuous delivery dashboard to review the integration build of the application and update an integration metric to indicate that the integration build was reviewed and approved by that quality engineer.

Figure 7:
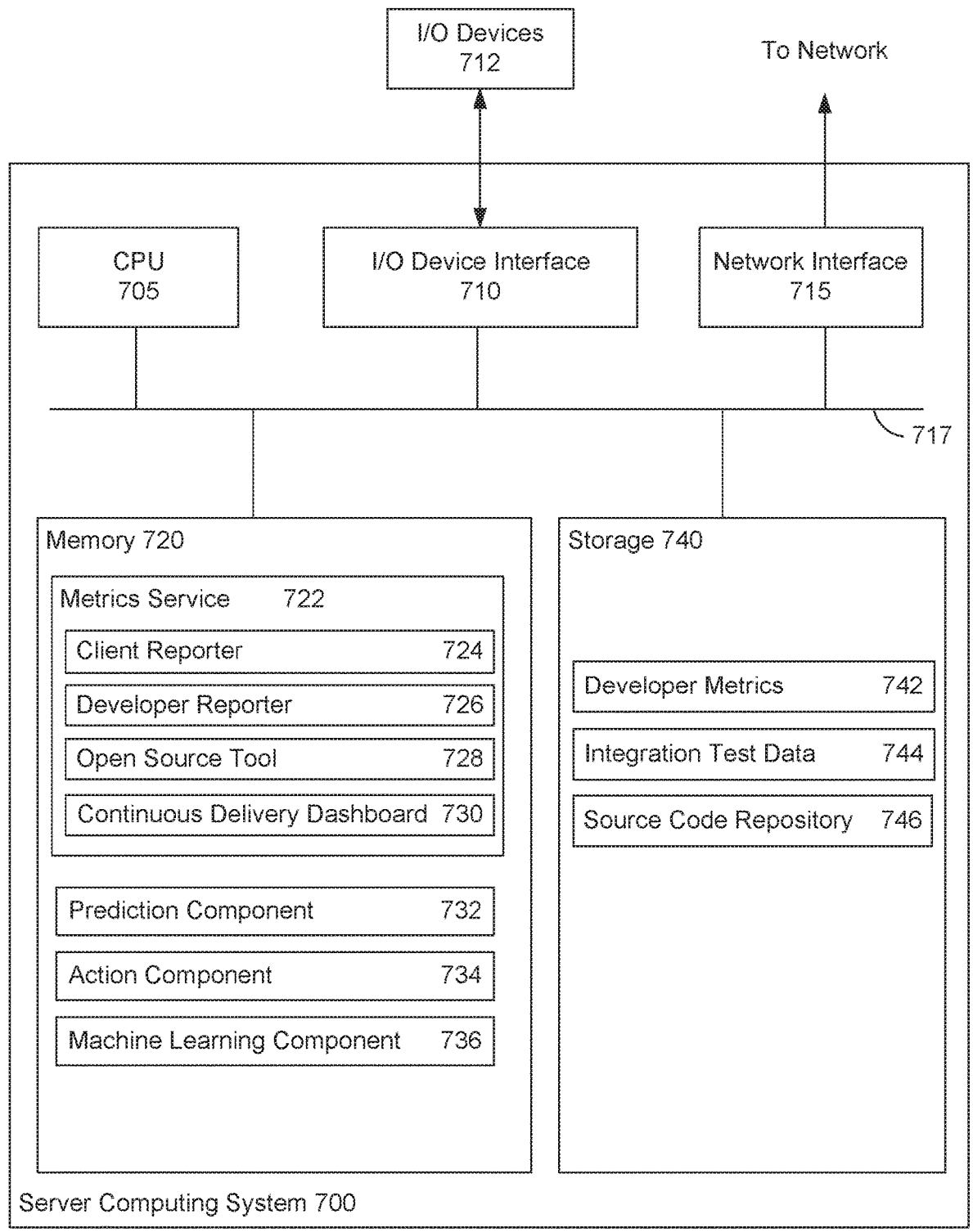
FIG. 7 illustrates an example computing system configured to predict the probability of a successful integration build of a software application, according to one embodiment.

FIG. 7 illustrates an example computing system 700 configured to predict the probability of a successful integration build of a software application, according to one embodiment. As shown, the computing system 700 includes, without limitation, a central processing unit (CPU) 705, a network interface 715, a memory 720, and storage 740, each connected to a bus 717. The computing system 700 may also include an I/O device interface 710 connecting I/O devices 712 (e.g., keyboard, display, mouse devices, image capture devices, etc.) to the computing system 700. Further, the computing elements shown in computing system 700 may correspond to a physical computing system (e.g., a system in a data center) or may be a virtual computing instance executing within a computing cloud.

The CPU 705 retrieves and executes programming instructions stored in the memory 720 as well as stored in the storage 740. The bus 717 is used to transmit programming instructions and application data between the CPU 705, I/O device interface 710, storage 740, network interface 715, and memory 720. Note, CPU 705 is included to be representative of a single CPU, multiple CPUs, a single CPU having multiple processing cores, and the like, and the memory 720 is generally included to be representative of a random access memory. The storage 740 may be a disk drive or flash storage device. Although shown as a single unit, the storage 740 may be a combination of fixed and/or removable storage devices, such as fixed disc drives, removable memory cards, optical storage, network attached storage (NAS), or a storage area-network (SAN). As shown, storage 740 includes developer data 742, integration test data 744 and a source code repository 746. The source code repository 746 stores source code of each component in the software application.

Illustratively, the memory 720 includes a metrics service 722 including client reporter 724, developer reporter 726, open source tool 728, and continuous delivery dashboard 730, prediction component 732, action component 734, and machine learning component 736. In certain aspects, these components may correspond to the components of the integration service 122 described with reference to FIG. 2.

For example, the source code repository may store source code for various source components that make up a larger software application. The client reporter 724 may obtain integration metrics related to each source component of the software application from integration test data 744. The integration metrics may include data regarding whether a given component was integrated with another component, whether that integration was tested, whether the test was successful and a length of time to integrate the components. The developer reporter 726 may obtain developer metrics for each developer that contributed to at least one of the source components of the software application. The developer metrics may be stored in developer data 742 and include data related to which components each developer contributed to, a number of check-ins of component source code by a given developer, whether that developer tested an integration build between components, and whether that test was successful.

Open source tool 728 may log and track the number of check-ins by each developer. For example, each time a developer checks-in a source code for a component, open source tool 728 may store a current time, an identity of the developer and which component was checked-in. This data may be stored in developer data 742.

The continuous delivery dashboard 730 may integrate each component of the software application. For example, each time a developer checks-in source code of a component, the continuous delivery dashboard 730 may integrate that component into the software application to replace a previous version of that component. The prediction component 732 determines a probability of a successful integration build of the software application with the updated component. To do so, the prediction component 732 may analyze the developer and integration metrics. Once the probability of a successful integration build is determined, the prediction component 732 may compare the probability to a target success percentage.

If the probability does not satisfy the target success percentage, the action component 734 may determine an action to increase the probability of a successful integration and a specific individual who should perform the action. For example, the action component 734 may determine that an integration build between a completion component and a pricing service should to be tested and debugged. Further, the action component 734 may determine, based on the developer and integration metrics, that the developer of the completion component needs to test that integration build.

Once the actions have been performed by the specified developer, the developer and integration metrics in developer data 742 and integration test data 744, respectively, may be updated based on the action taken. For example, if the developer of the completion component tested an integration build between the completion component and the pricing service, the integration metrics may be updated to indicate which components were integrated and tested, a length of time to integrate the components, a current time of the integration test, and whether the test was successful or failed.

The machine learning component 736 may be used to determine the probability of a successful integration build of the software application. To do so, the machine learning component 736 may analyze the developer and integration metrics of previous integration builds to identify integration test patterns between components of the software application.

For example, a previous integration build of the software application may have failed. In that failed integration, the machine learning component 736 may determine that an integration build between a completion component and a pricing service was not tested prior to the integration build of the software application. The machine learning component 736 may also determine that another integration of that application succeeded when the integration between the completion component and pricing service was tested prior to the integration build of the application.

Thus, the machine learning component 736 may determine that an integration build of that application would fail unless the integration build between the completion component and pricing service is tested prior to integrating the software application. The action component 734 may use this information to determine that a developer of the completion component should be notified to test the integration build between that component and the pricing service.

Once all components are integrated into the software application and the probability satisfies the target success percentage, the continuous delivery dashboard 730 may notify a quality engineer to review the integration build. Once the quality engineer determines that the integration build is successful, the quality engineer may add an integration metric in the integration test data 744 which indicates that the quality engineer has reviewed and marked the integration build as successful.

It may be noted that, descriptions of embodiments of the present disclosure are presented above for purposes of illustration, but embodiments of the present disclosure are not intended to be limited to any of the disclosed embodiments. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present disclosure may take the form of an entirely hardware embodiment, an entirely software embodiment (including firmware, resident software, micro-code, etc.) or an embodiment combining software and hardware aspects that may all generally be referred to herein as a "component," "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples a computer readable storage medium include: an electrical connection having one or more wires, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the current context, a computer readable storage medium may be any tangible medium that can contain, or store a program.

The flowcharts and block diagrams in the Figures illustrate the architecture, functionality and operation of possible implementations of systems, methods and computer program products according to various embodiments of the present invention. In this regard, each block in the flowchart or block diagrams may represent a module, segment or portion of code, which comprises one or more executable instructions for implementing the specified logical function(s). In some alternative implementations the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams and/or flowchart illustrations, and combinations of blocks in the block diagrams and/or flowchart illustrations can be implemented by special-purpose hardware-based systems that perform the specified functions or acts, or combinations of special purpose hardware and computer instructions.

[ono] While the foregoing is directed to embodiments of the present disclosure, other and further embodiments of the disclosure may be devised without departing from the basic scope thereof, and the scope thereof is determined by the claims that follow.

What is claimed is:

1. A computer-implemented method for predicting an integration failure, the method comprising:
    monitoring a plurality of integration builds between source components of a software application under development, wherein each integration build of the plurality of integration builds includes at least a first one of the source components and a second one of the source components, and wherein the monitoring includes determining whether each respective integration build of the monitored plurality of integration builds was successful;
    performing a comparison of the monitored plurality of integration builds with prior integration builds of the software application, wherein performing the comparison comprises:
        identifying an integration pattern between the first one of the source components and the second one of the source components based on the monitored plurality of integration builds;
        identifying a prior successful integration pattern;
        determining a minimum distance measure between the integration pattern and the prior successful integration pattern; and
        determining the prior successful integration pattern is not identical to the integration pattern based on the minimum distance measure;
    predicting, based on the comparison, a probability of successfully building the software application from the first one of the source components and second one of the source components;
    determining, based on the comparison, one or more actions to be taken with respect to a given source component of the source components to increase the probability of successfully building the software application from the source components;
    determining, based on the comparison, a particular developer to perform the one or more actions by determining that the particular developer worked on the given source component; and
    notifying the particular developer that the one or more actions should be performed.

2. The method of claim 1, wherein the monitoring includes identifying a developer that performed the integration build between at least the first one of the source components and the second one of the source components.

3. The method of claim 1, wherein determining, based on the comparison, the one or more actions to be taken to increase the probability of successfully building the software application from the source components further comprises:
    determining that the probability of successfully building the software application does not satisfy a target success percentage;
    identifying a number of integration builds between the first one of the source components and the second one of the source components during a development cycle; and
    identifying, based on the number of integration builds, the one or more actions.

4. The method of claim 1, wherein determining, based on the comparison, the one or more actions to be taken to increase the probability of successfully building the software application from the source components further comprises adding the integration pattern to a set of prior successful integration patterns that includes the prior successful integration pattern.

5. The method of claim 1, wherein the one or more actions includes increasing a number of integration builds between the first one of the source components and the second one of the source components prior to the integration build of the software application.

6. The method of claim 1, wherein predicting the probability of successfully building the software application is based on comparing metrics related to the source components of the software application to metrics related to the source components of the prior integration builds.

7. The method of claim 6, wherein obtained metrics include at least one of:
    a developer of each of the source components;
    a development team of each developer;
    a number of check-ins by each developer each day; or
    whether a first developer previously executed a test of the integration build between the first one of the source components and the second one of the source components and whether the test was successful.

8. A non-transitory computer-readable storage medium storing instructions, which, when executed on a processor, perform an operation to predict an integration failure, the operation comprising:
monitoring a plurality of integration builds between source components of a software application under development, wherein each integration build of the plurality of integration builds includes at least a first one of the source components and a second one of the source components, and wherein the monitoring includes determining whether each respective integration build of the plurality of integration builds was successful;
performing a comparison of the monitored plurality of integration builds with prior integration builds of the software application, wherein performing the comparison comprises:
identifying an integration pattern between the first one of the source components and the second one of the source components based on the monitored plurality of integration builds;
identifying a prior successful integration pattern;
determining a minimum distance measure between the integration pattern and the prior successful integration pattern; and
determining the prior successful integration pattern is not identical to the integration pattern based on the minimum distance measure;
predicting, based on the comparison, a probability of successfully building the software application from the first one of the source components and second one of the source components;
determining, based on the comparison, one or more actions to be taken with respect to a given source component of the source components to increase the probability of successfully building the software application from the source components;
determining, based on the comparison, a particular developer to perform the one or more actions by determining that the particular developer worked on the given source component; and
notifying the particular developer that the one or more actions should be performed.

9. The non-transitory computer-readable storage medium of claim 8, wherein the monitoring includes identifying a developer that performed the integration build between at least the first one of the source components and the second one of the source components.

10. The non-transitory computer-readable storage medium of claim 8, wherein determining, based on the comparison, the one or more actions to be taken to increase the probability of successfully building the software application from the source components further comprises:
determining that the probability of successfully building the software application does not satisfy a target success percentage;
identifying a number of integration builds between source components during a development cycle; and
identifying, based on the number of integration builds, the one or more actions.

11. The non-transitory computer-readable storage medium of claim 9, wherein, determining, based on the comparison, the one or more actions to be taken to increase the probability of successfully building the software application from the source components comprises adding the integration pattern to a set of prior successful integration patterns that includes the prior successful integration pattern.

12. The non-transitory computer-readable storage medium of claim 8, wherein the one or more actions includes increasing a number of integration builds between the first one of the source components and the second one of the source components prior to the integration build of the software application.

13. The non-transitory computer-readable storage medium of claim 8, wherein predicting the probability of successfully building the software application is based on comparing metrics related to the source components of the software application to metrics related to the source components of the prior integration builds.

14. The non-transitory computer-readable storage medium of claim 13, wherein obtained metrics include at least one of:
a developer of each of the source components;
a development team of each developer;
a number of check-ins by the developer each day;
whether a first developer previously executed a test of the integration build between the first one of the source components and the second one of the source components and whether the test was successful.

15. A system, comprising:
a processor; and
a memory hosting an application, which, when executed on the processor, performs an operation to predict an integration failure, the operation comprising:
monitoring a plurality of integration builds between a first one of the source components and a second one of the source components of a software application under development, wherein each integration build of the plurality of integration builds includes at least the first one of the source components and the second one of the source components, and wherein the monitoring includes determining whether each respective integration build of the monitored plurality of integration builds was successful;
performing a comparison of the monitored plurality of integration builds with prior integration builds of the software application, wherein performing the comparison comprises:
identifying an integration pattern between the first one of the source components and the second one of the source components based on the monitored plurality of integration builds;
identifying a prior successful integration pattern;
determining a minimum distance measure between the integration pattern and the prior successful integration pattern; and
determining the prior successful integration pattern is not identical to the integration pattern based on the minimum distance measure;
predicting, based on the comparison, a probability of successfully building the software application from the first one of the source components and second one of the source components;
determining, based on the comparison, one or more actions to be taken with respect to a given source component of the source components to increase the probability of successfully building the software application from the source components;
determining, based on the comparison, a particular developer to perform the one or more actions by determining that the particular developer worked on the given source component; and notifying the particular developer that the one or more actions should be performed.

16. The system of claim 15, wherein the monitoring includes identifying a developer that performed the integration build between at least the first one of the source components and the second one of the source components.

17. The system of claim 15, wherein determining, based on the comparison, the one or more actions to be taken to increase the probability of successfully building the software application from the source components further comprises:

determining that the probability of successfully building the software application does not satisfy a target success percentage;

identifying a number of integration builds between the first one of the source components and the second one of the source components during a development cycle; and identifying, based on the number of integration builds, the one or more actions.

18. The system of claim 15, wherein determining, based on the comparison, the one or more actions to be taken to increase the probability of successfully building the software application from the source components further comprises adding the integration pattern to a set of prior successful integration patterns that includes the prior successful integration pattern.

19. The system of claim 15, wherein the one or more actions includes increasing a number of integration builds between the first one of the source components and the second one of the source components prior to the integration build of the software application.

20. The system of claim 15, wherein predicting the probability of successfully building the software application is based on comparing metrics related to the source components of the software application to metrics related to the source components of the prior integration builds.

* * * * *